US007475622B1

(12) United States Patent
Chang

(10) Patent No.: US 7,475,622 B1

(45) Date of Patent: Jan. 13, 2009

(54) SUPPORTING DEVICE FOR MOUNTING A PROTECTIVE COVER TO SHIELD A CUTTING BLADE OF A CUTTING MACHINE

(75) Inventor: Yueh-Hsun Chang, Nan-Tou Hsien (TW)

(73) Assignee: P & F Brother Industrial Corporation, Taichung (TW)

( * ) Notice: Subject to any disclaimer, the term of this patent is extended or adjusted under 35 U.S.C. 154(b) by 0 days.

(21) Appl. No.: 11/977,779

(22) Filed: Oct. 26, 2007

(51) Int. Cl.
*B23D 19/00* (2006.01)

(52) U.S. Cl. ........................................ 83/477.2; 83/478

(58) Field of Classification Search ................ 83/477.2, 83/478, 102.1, 581; 30/391; 144/356; 248/316.1, 248/274.1, 289.1, 200, 694
See application file for complete search history.

(56) References Cited

U.S. PATENT DOCUMENTS

| | | | | |
|---|---|---|---|---|
| 5,531,147 | A * | 7/1996 | Serban | 83/478 |
| 5,890,292 | A * | 4/1999 | Stark et al. | 30/124 |
| 7,159,586 | B2 * | 1/2007 | Governo | 125/13.03 |
| 2001/0045149 | A1 * | 11/2001 | Granger | 83/335 |
| 2005/0051008 | A1 * | 3/2005 | Granger | 83/335 |
| 2006/0000328 | A1 * | 1/2006 | Terashima et al. | 83/471.3 |
| 2007/0113714 | A1 * | 5/2007 | Burke et al. | 83/102.1 |
| 2007/0113715 | A1 * | 5/2007 | Burke et al. | 83/102.1 |
| 2007/0277661 | A1 * | 12/2007 | Domeny et al. | 83/477.2 |
| 2008/0083313 | A1 * | 4/2008 | Chuang | 83/473 |

* cited by examiner

*Primary Examiner*—Ramon O Ramirez
(74) *Attorney, Agent, or Firm*—K&L Gates LLP

(57) ABSTRACT

A supporting device is adapted for mounting a protective cover to shield a cutting blade of a cutting machine, and includes a mount unit with a proximate tightening surface, a tightening bolt passing through the proximate tightening surface, a supporting frame adapted for holding the protective cover and having a guiding slot for passage of the tightening bolt so as to be movable between a position of use and a retreat position, a movable tightening member with a distal tightening surface and a cam follower surface, a cam actuating member having a cam surface mating with the cam follower surface and turnable to tighten or loosen the supporting frame, and a biasing member disposed to keep the actuating body in a tightening position.

9 Claims, 11 Drawing Sheets

SUPPORTING DEVICE FOR MOUNTING A PROTECTIVE COVER TO SHIELD A CUTTING BLADE OF A CUTTING MACHINE

BACKGROUND OF THE INVENTION

1. Field of the Invention

This invention relates to a supporting device for mounting a protective cover to shield a cutting blade of a cutting machine, more particularly to a supporting device which is easily operated to be tightened firmly to a position of use or a retreat position.

2. Description of the Related Art

In a conventional table cutting machine, such as a circular saw machine, a supporting device is disposed adjacent to a circular saw blade for mounting a protective cover to shield the circular saw blade. The supporting device is detachably disposed on a worktable so as not to obstruct specific working operation, such as cutting a slot in a workpiece.

Referring to FIG. 1, a conventional supporting device 10 includes a fixed mount unit 11, a tightening mount unit 12 movably disposed on the fixed mount unit 11, and a control unit 13 disposed between the fixed and tightening mount units 11,12. The fixed mount unit 11 has a fixed mount 111 secured on a tabletop (not shown) of a cutting machine. The fixed mount 111 has a sliding slot 112 in a side thereof for fitting of a tightening mount unit 12. The tightening mount unit 12 has a tightening plate 121 which is fitted to the sliding slot 112, a cam follower piece 122 which is embedded into the tightening plate 121, and a limiting pin 123 which extends outwardly of the tightening plate 121. The control unit 13 has a tightening bolt 131, a cam piece 132 which meshes with the cam follower piece 122, a handgrip 133 which extends radially from the cam piece 132, and a limiting protrusion 134 which is disposed on the cam piece 132 to abut against the limiting pin 123. A clearance is present between the tightening plate 121 and a side of the fixed mount 111 for accommodating a lower portion of a supporting frame 1. An upper portion of the supporting frame 1 is adapted to hold a protective cover (not shown). When the user operates the handgrip 133 to rotate the cam piece 132, the cam follower piece 122 is pressed toward the fixed mount 111 so as to tighten the supporting frame 1 for positioning the protective cover on the cutting machine. However, the cam piece 132 may be rotated to cause movement of the cam follower piece 122 away from the tightening plate 121 when the machine is vibrated during the cutting operation, thereby resulting in undesired detachment of the supporting frame 1 from the tightening mount unit 12.

Referring to FIG. 2, another supporting device 20 includes a mounting unit 21, a supporting frame unit 22 and a control unit 23. The mounting unit 21 has a fixed mount 211 and a tightening plate 212. The supporting frame unit 22 has a supporting frame 221 which is disposed between the fixed mount 211 and the tightening plate 212, and which has an arcuate slot 2211. The control unit 23 has a tightening bolt 231 which extends through the arcuate slot 2211 and into the fixed mount 211, two washers 232 which are sleeved on the tightening bolt 231, a guide pin 233 which is disposed on the tightening bolt 231, and a cam actuator 234 which is sleeved on the tightening bolt 231 at one end thereof, and which has a handgrip at the other end. The cam actuator 234 has a spirally extending groove 2341 which surrounds the tightening bolt 231 for guiding movement of the guide pin 233. Thus, when the user rotates the cam actuator 234, the cam actuator 234 can press the tightening plate 212 via the washers 232 towards the fixed mount 211 so as to tighten the supporting frame 221.

However, undesired loosening of the supporting frame 221 may occur after a long-term use.

SUMMARY OF THE INVENTION

The object of the present invention is to provide a supporting device which is easily operated to be tightened firmly to a position of use or a retreat position relative to a cutting machine.

According to this invention, the supporting device includes a mount unit which is adapted to be secured to a cutting machine. The mount unit includes a major abutment wall which has a proximate tightening surface that has an axial hole extending therethrough along a tightening axis. A tightening bolt has a shank which passes through the axial hole, and which has front and rear ends, and an intermediate segment. A supporting frame has an upper end which is adapted to hold a protective cover, and a middle segment which has proximate and distal tightened major surfaces opposite to each other along the tightening axis, and a guiding slot that extends through the proximate and distal tightened major surfaces to permit passage of the shank therethrough such that the middle segment is movable between a position of use where the shank is remote from the upper end, and a retreat position where the shank is closer to the upper end. A movable tightening member is sleeved on the shank, and has a thrust major wall which has a distal tightening surface to press the distal tightened major surface of the supporting frame so as to force the proximate tightened major surface to abut against the proximate tightening surface of the mount unit. The thrust major wall further has a cam follower surface which is opposite to the distal tightening surface, and which has first and second pressed areas that are angularly displaced from each other about the tightening axis, and that are respectively proximate to and distal from the distal tightening surface along the tightening axis. A cam actuating member includes an actuating body and a handgrip. The actuating body is sleeved on the shank, and has a cam surface and an outmost major surface opposite to each other. The cam surface has first and second pressing spots which are angularly displaced from each other about the tightening axis such that the first and second pressing spots are brought into contact with the first and second pressed areas respectively when the cam surface is brought to mate with the cam follower surface in a loosened position, and such that, when the actuating body is turned about the tightening axis to a tightening position, the first pressing spot is displaced to contact the second pressed area with an axial frictional force so as to move the distal tightening surface to press the distal tightened major surface, thereby forcing the proximate tightened major surface to abut against the proximate tightening surface. The handgrip extends from the actuating body radially so as to turn the actuating body about the tightening axis between the loosened and tightening positions. A biasing member is disposed on the shank adjacent to the rear end of the shank such that, as a result of displacement of the actuating body to the tightening position, the biasing member acquires an increment of a biasing force which biases the front end of the shank towards the supporting frame so as to counteract the axial frictional force to thereby keep the actuating body in the tightening position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
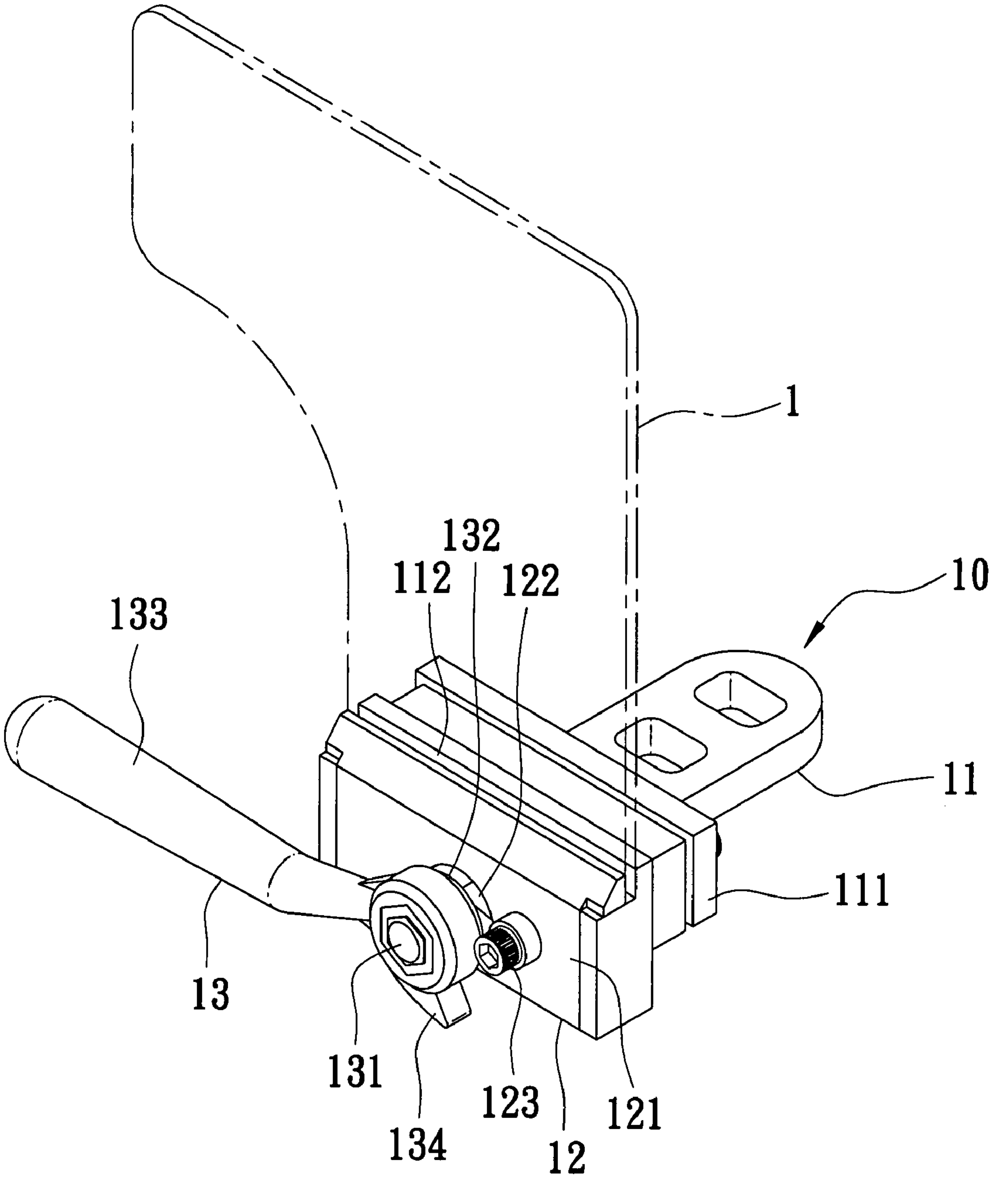
FIG. 1 PRIOR ART
FIG. 1 is a perspective view of a conventional supporting device.
Figure 2:
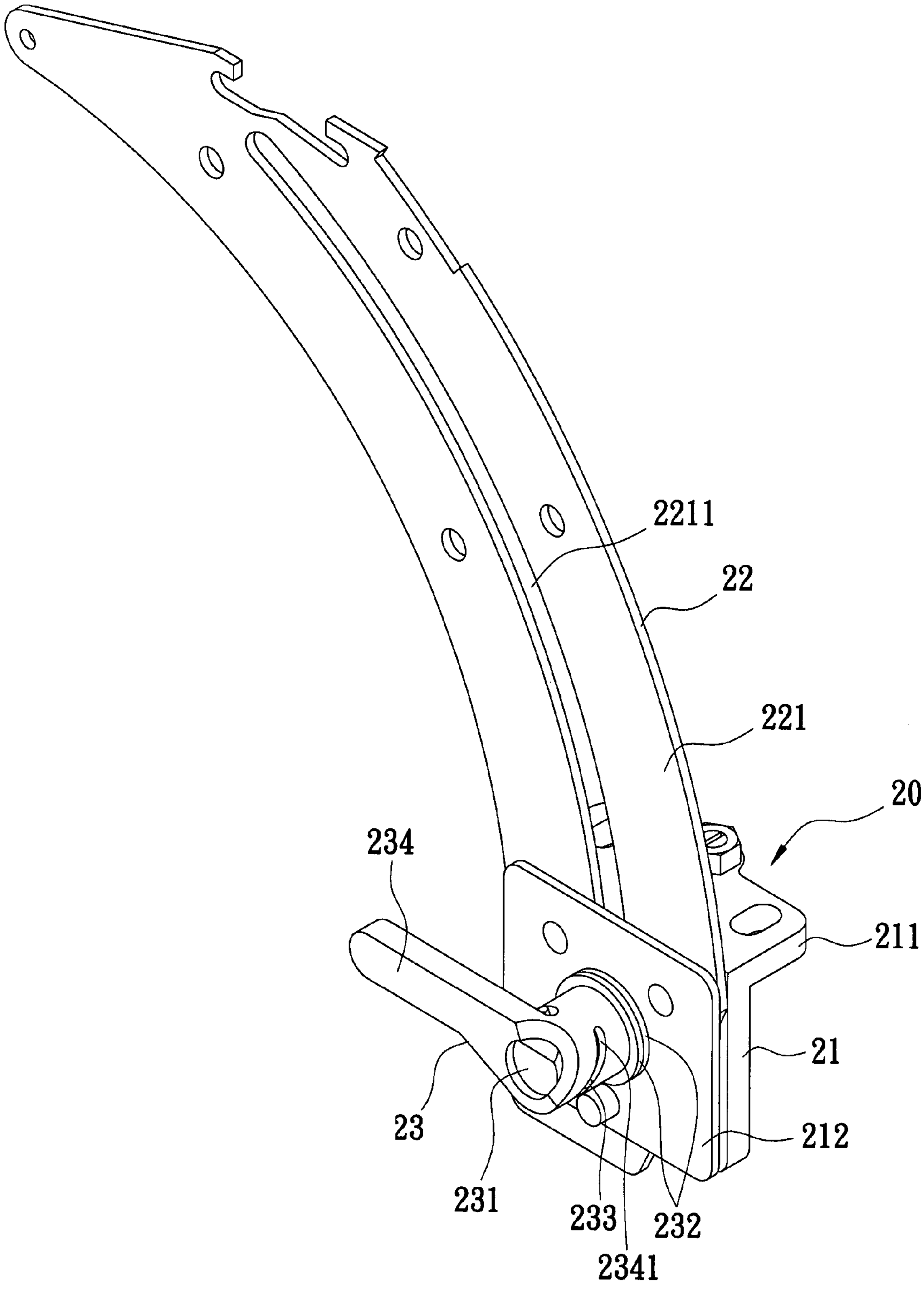
FIG. 2 PRIOR ART
FIG. 2 is a perspective view of another conventional supporting device.
Figure 3:
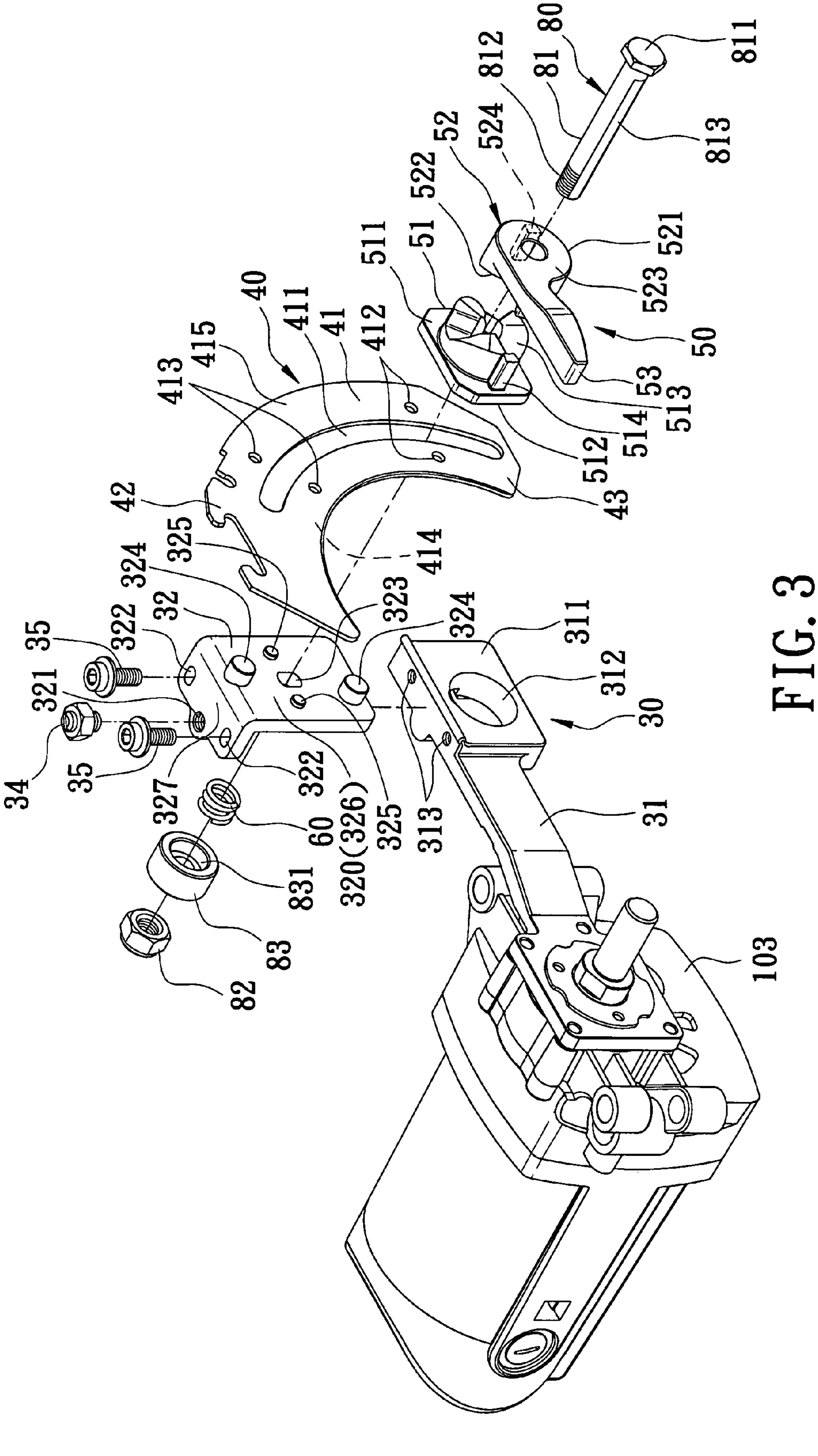
FIG. 3 is an exploded perspective view of a preferred embodiment of a supporting device according to this invention.
Figure 4:
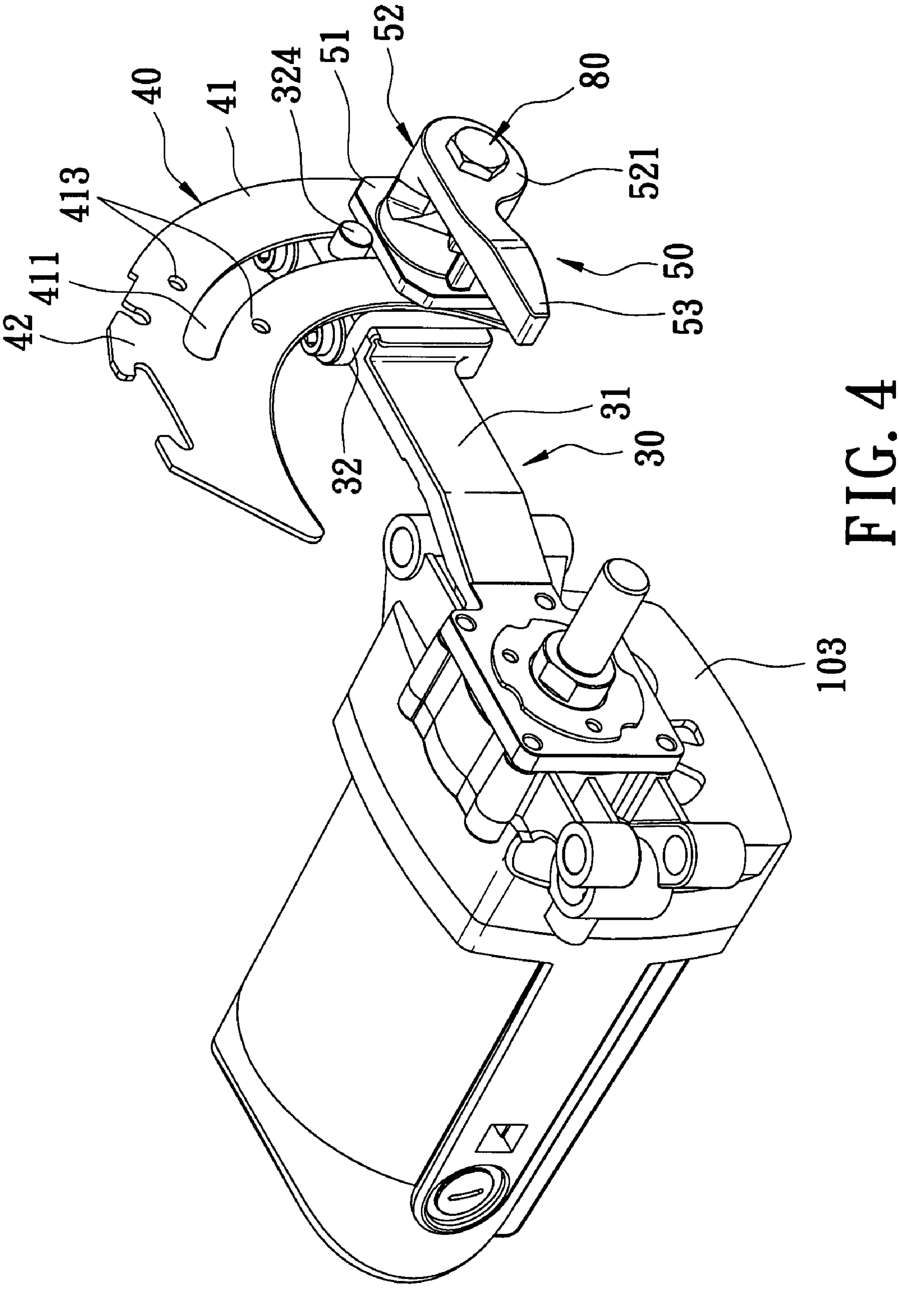
FIG. 4 is a perspective view of the preferred embodiment when assembled on a cutting machine.
Figure 5:
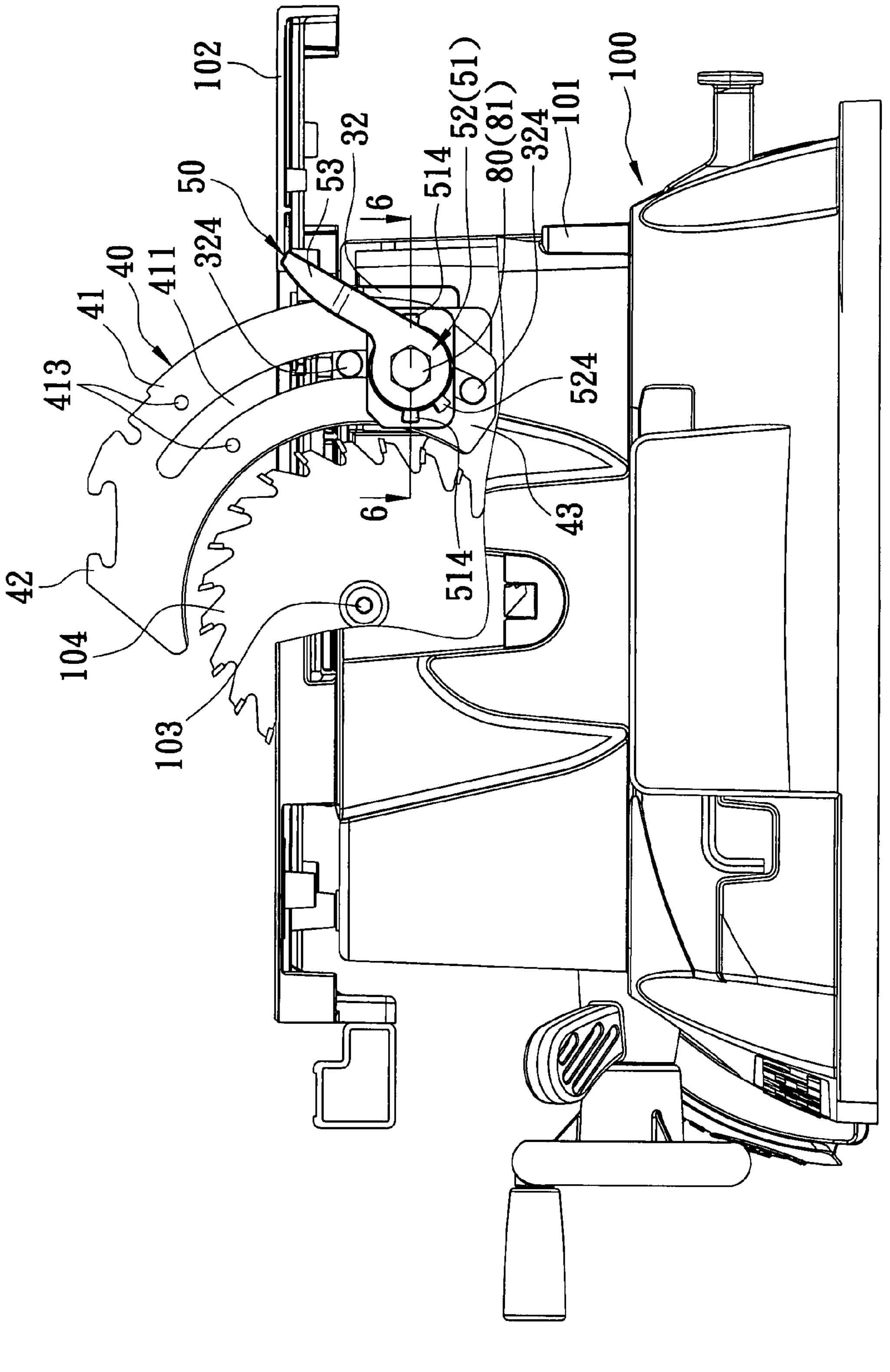
FIG. 5 is a fragmentary schematic side view showing a supporting frame of the preferred embodiment in a position of use.
Figure 6:
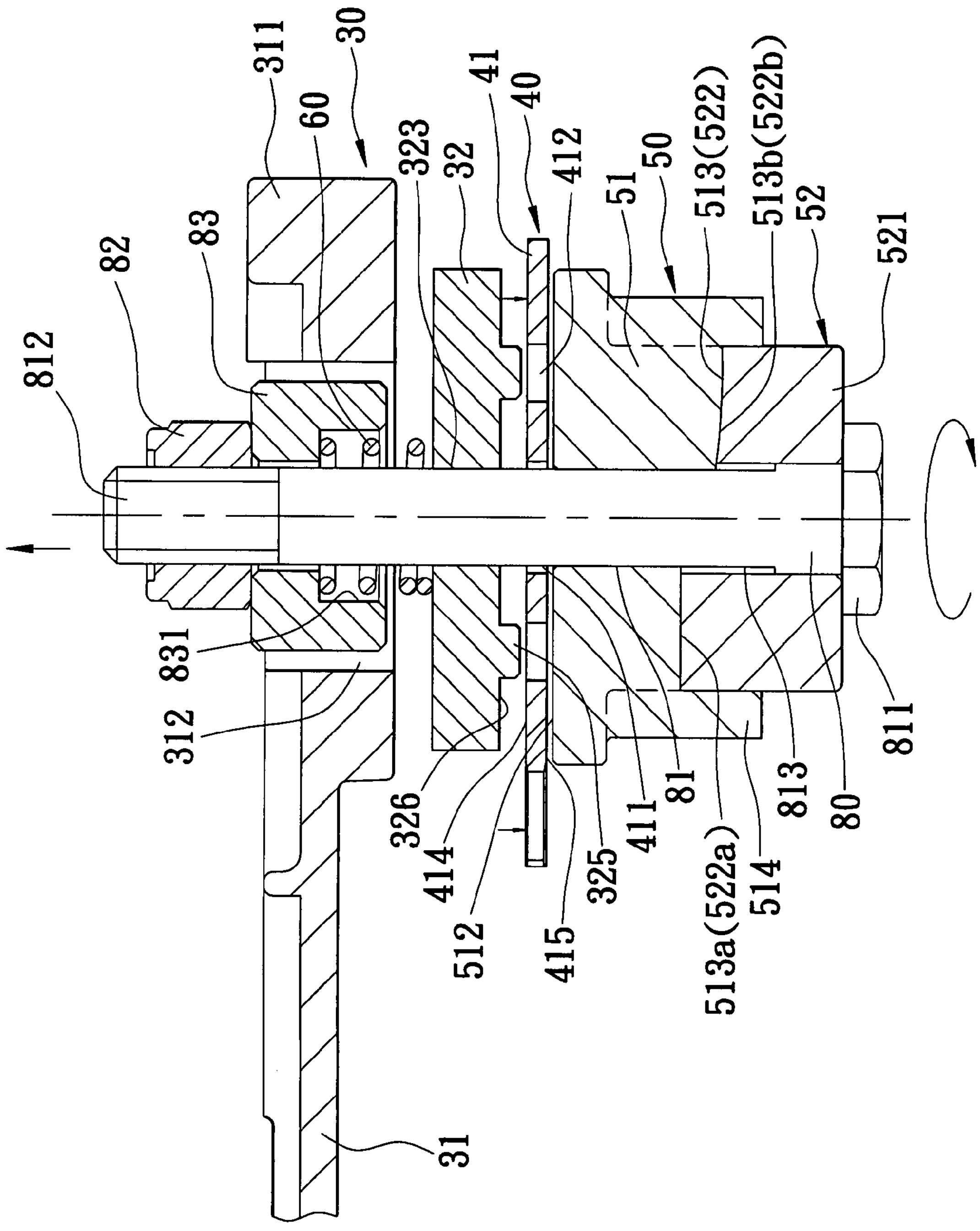
FIG. 6 is a sectional view of the preferred embodiment taken along lines 6-6 of FIG. 5 and showing a cam actuating member in a loosened position.

Referring to FIG. 5, a preferred embodiment of a supporting device according to the present invention is adapted to be mounted on a cutting machine 100, such as a table saw machine. The cutting machine 100 includes a machine body 101, a worktable 102 mounted on the machine body 101, a drive motor 103 mounted in the machine body 101, and a circular saw blade 104 mounted axially on the drive motor 103 to be driven to rotate about a rotating axis. The circular saw blade 104 has a working part that extends outwardly of the worktable 102 for working a workpiece (not shown) supported on the worktable 102. With reference to FIGS. 3, 4 and 6, the supporting device of this embodiment is shown to comprise amount unit 30, a tightening bolt 80, a supporting frame 40, a movable tightening unit 50, and a biasing member 60.

The mount unit 30 includes an elongated fixed mount 30 which is adapted to be secured to the drive motor 103 at a left end thereof, and which has a throughbore 312 at a right end 311 thereof. The throughbore 312 defines a tightening axis parallel to the rotating axis of the saw blade 104. The mount unit 30 further includes a movable mount 32 which has a major abutment wall 320 that is disposed forwardly of the right end 311 of the fixed mount 31 along the tightening axis, and that has an elongated axial hole 323 extending therethrough and coaxial with the throughbore 312. The major abutment wall 320 has a proximate tightening surface 326 facing forwardly.

The movable mount 32 has an anchoring wall 327 which extends rearwardly from an upper edge of the major abutment wall 320, and which has a pair of positioning holes 322 that extend therethrough and that are elongated in a longitudinal direction parallel to the tightening axis. A pair of first screw fasteners 35 are disposed to respectively extend through the positioning holes, and are respectively and threadedly engaged with two screw holes 313 in the fixed mount 31. Thus, the position of the movable mount 32 relative to the fixed mount 31 in the longitudinal direction is adjustable by movement of the first screw fasteners 35 in the positioning holes 322 in the longitudinal direction. In addition, a second screw fastener 34 is threadedly engaged with a screw hole 321 in a center of the anchoring wall 327 and extends to abut against the fixed mount 31 so as to generate a depressing force to render an angular position of the major abutment wall 320 of the movable mount 32 relative to the fixed mount 31 adjustable by virtue of varying the depression force. Thus, the longitudinal and angular positions of the supporting frame 40 can be corrected to be in line with the saw blade 104.

Further, the major abutment wall 320 of the movable mount 32 has two limiting pins 324 and two retaining pins 325 which extend from the proximate tightening surface 326 and which are disposed upwardly, downwardly, leftwardly and rightwardly of the axial hole 323, respectively.

The tightening bolt 80 has a shank 81 which is configured to pass through the axial hole 323 and the throughbore 312, and which has front and rear ends 811,812 opposite to each other in the tightening axis, and an intermediate segment 813 that is interposed between the front and rear ends 811,812 and that has a non-circular cross-section so as to be movable relative to the major abutment wall 320 along the tightening axis. The tightening bolt 80 further has a screw nut 82 which is threadedly engaged with the rear end 812 of the shank 81, and a flexible joint 83 which is received in the throughbore 312, which is sleeved on the intermediate segment 813 of the shank 81 between the screw nut 82 and the major abutment wall 320 of the movable mount 32, and which has an accommodation chamber 831.

Figure 7:
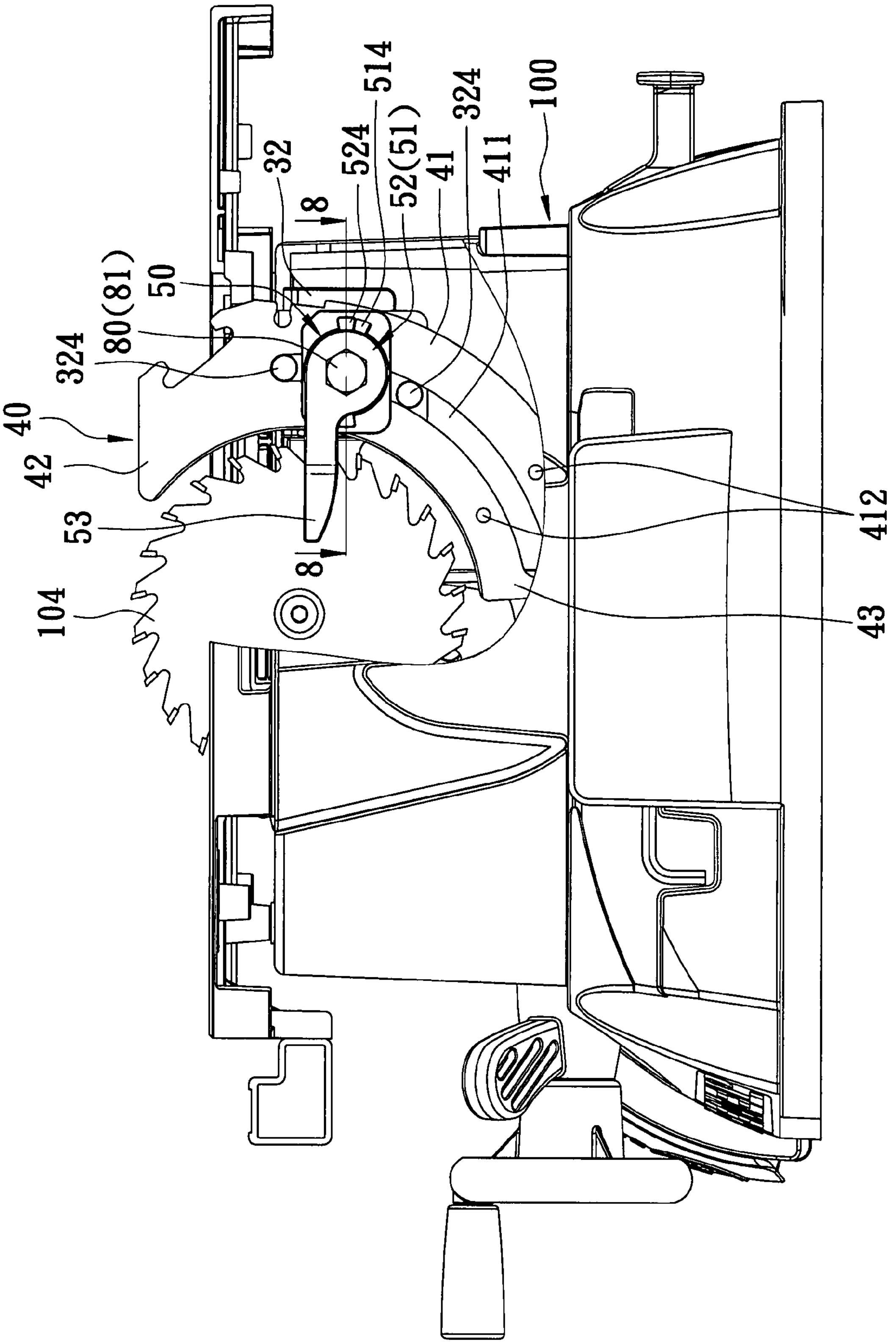
FIG. 7 is a fragmentary schematic side view showing the supporting frame in a retreat position.

The supporting frame 40 has upper and lower ends 42,43 opposite to each other, and a middle segment 41 interposed between the upper and lower ends 42,43. The upper end 42 is adapted to hold a protective cover (not shown). The middle segment 41 has proximate and distal tightened major surfaces 414,415 opposite to each other along the tightening axis, and an arcuate guiding slot 411 which extends through the proximate and distal tightened major surfaces 414,415 and which permits passage of the shank 81 therethrough. The middle segment 41 further has two upper retaining holes 413 and two lower retaining holes 412 proximate to the upper and lower ends 42,43, respectively. The guiding slot 411 is configured to permit the middle segment 41 to be movable between a position of use, as shown in FIG. 5, where the shank 81 is remote from the upper end 42, and where the lower retaining holes 412 engage the retaining pins 325 so that the lower limiting pin 324 reaches a lowermost area of the guiding slot 411, and a retreat position, as shown in FIG. 7, where the shank 81 is closer to the upper end 42, and where the upper retaining holes 413 engage the retaining pins 325 so that the upper limiting pin 324 reaches an uppermost area of the guiding slot 411. By means of the upper and lower retaining holes 413,412 and the retaining pins 325 that serve as a retaining unit, the supporting frame 40 can be retained in a corresponding one of the position of use and the retreat position.

Figure 8:
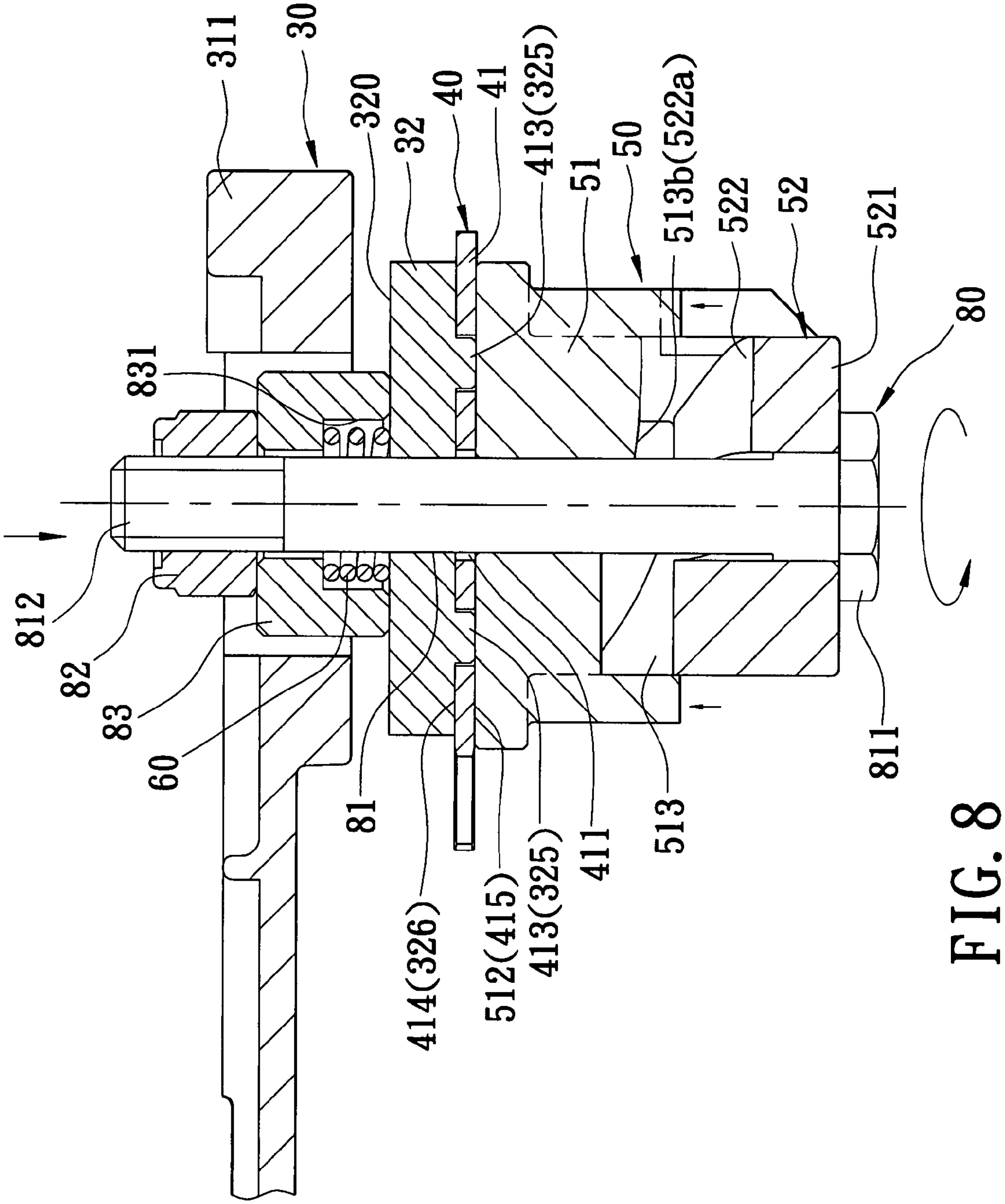
FIG. 8 is a sectional view of the preferred embodiment taken along lines 8-8 of FIG. 7 and showing the cam actuating member in a tightening position.

The movable tightening unit 50 includes a movable tightening member 51 and a cam actuating member 52. The movable tightening member 51 is sleeved on the intermediate segment 813 of the shank 81, and has a thrust major wall 511 to which the tightening axis is normal. The thrust major wall 511 has a distal tightening surface 512 which confronts and which is to be brought to press the distal tightened major surface 415 so as to force the proximate tightened major surface 414 to abut against the proximate tightening surface 326, and a cam follower surface 513 which is opposite to the distal tightening surface 512 along the tightening axis, and which is of a wedge shape. Specifically, as shown in FIGS. 6 and 8, the cam follower surface 513 has first and second pressed areas (513*a*,513*b*) which are angularly displaced from each other about the tightening axis, and which are respectively proximate to and distal from the distal tightening surface 512 along the tightening axis. In addition, the movable tightening member 51 further has left and right limited pins 514 which are disposed on the thrust major wall 511 at an outer periphery of the cam follower surface 513 and which are radially opposite to each other.

The cam actuating member 52 includes an actuating body 521 and a handgrip 53. The actuating body 521 is sleeved on the intermediate segment 813 of the shank 81, and has a cam surface 522 and an outmost major surface 523 opposite to each other in the tightening axis to abut against the front end 811 of the shank 81. The cam surface 522 is of a wedge shape. Specifically, as shown in FIGS. 6 and 8, the cam surface 522 has first and second pressing spots (522*a*,522*b*) which are angularly displaced from each other about the tightening axis such that, the first and second pressing spots (522*a*,522*b*) are brought into contact with the first and second pressed areas (513*a*,513*b*), respectively, when the cam surface 522 is brought to mate with the cam follower surface 513 in a loosened position (as shown in FIG. 6), and such that, when the actuating body 521 is turned about the tightening axis to a tightening position (as shown in FIG. 8), the first pressing spot (522*a*) is displaced to contact the second pressed area (513*b*) with an axial frictional force so as to move the distal tightening surface 512 to press the distal tightened major surface 415, thereby forcing the proximate tightened major surface 414 to abut against the proximate tightening surface 326. The handgrip 53 is disposed to extend from the actuating body 521 radially so as to turn the actuating body 521 about the tightening axis between the loosened and tightening positions. In addition, the actuating body 521 further has a limiting pin 524 which is disposed at an outer periphery thereof and which abuts against a corresponding one of the left and right limited pins 514 so as to restrict turning of the actuating body 521 within a certain range.

The biasing member 60 is a coil spring 60 in this embodiment. The coil spring 60 is disposed to surround the shank 81, and has an end abutting against the major abutment wall 320, and an opposite end which is received in the accommodation chamber 831 in the flexible joint 83. Thus, the coil spring 60 acquires a biasing force which urges the tightening bolt 80 and the movable tightening unit 50 rearwardly so as to force the middle segment 41 of the supporting frame 40 to abut against the proximate tightening surface 326. Moreover, the biasing force of the coil spring 60 is adjustable by threaded movement of the screw nut 82 while being kept in line with the tightening axis. Furthermore, as a result of displacement of the actuating body 521 to the tightening position, as shown in FIG. 8, the coil spring 60 is being compressed to acquire an increment of the biasing force which can bias the front end 811 of the shank 81 towards the supporting frame 40 so as to counteract the axial frictional force to thereby keep the actuating body 521 in the tightening position.

As illustrated, the supporting frame 40 can be tightened firmly in the tightening position so as to hold a protective cover (not shown) against vibration of the cutting machine 100 during a cutting operation. In addition, by operating the handgrip 53 to turn the actuating body 521 about the tightening axis, the supporting frame 40 can be easily tightened to and loosened from the movable mount 32 such that the supporting frame 40 can be moved to a corresponding one of the position of use and the retreat position when being loosened. Furthermore, by means of the retaining unit, i.e., the retaining pins 325 and the retaining holes 413,412, the supporting frame 40 can be retained in the corresponding one of the position of use and the retreat position.

Figure 9:
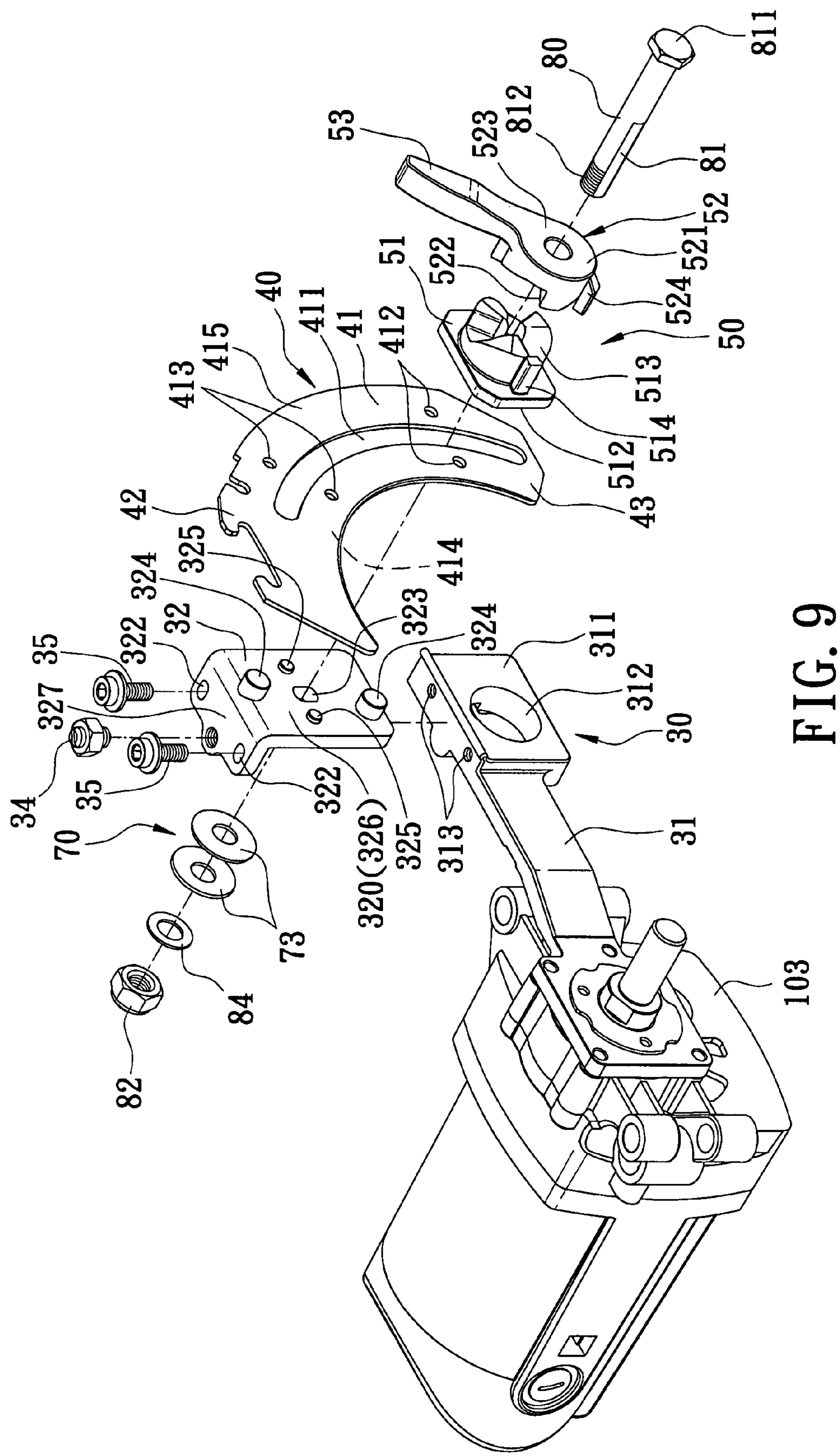
FIG. 9 is an exploded perspective view of another preferred embodiment of a supporting device according to this invention.
Figure 10:
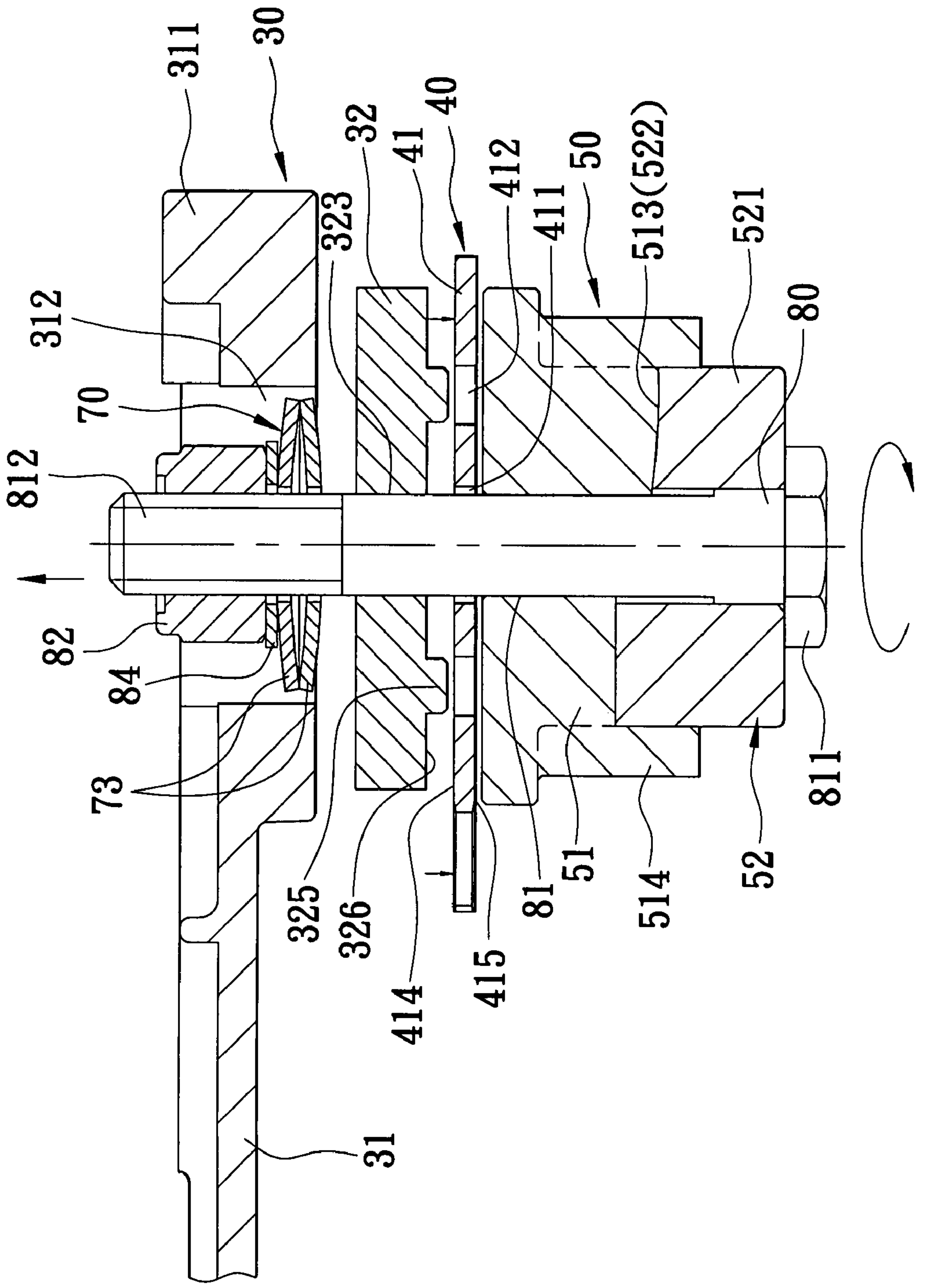
FIG. 10 is a sectional view of the preferred embodiment shown in FIG. 9 when a cam actuating member is in a loosened position.
Figure 11:
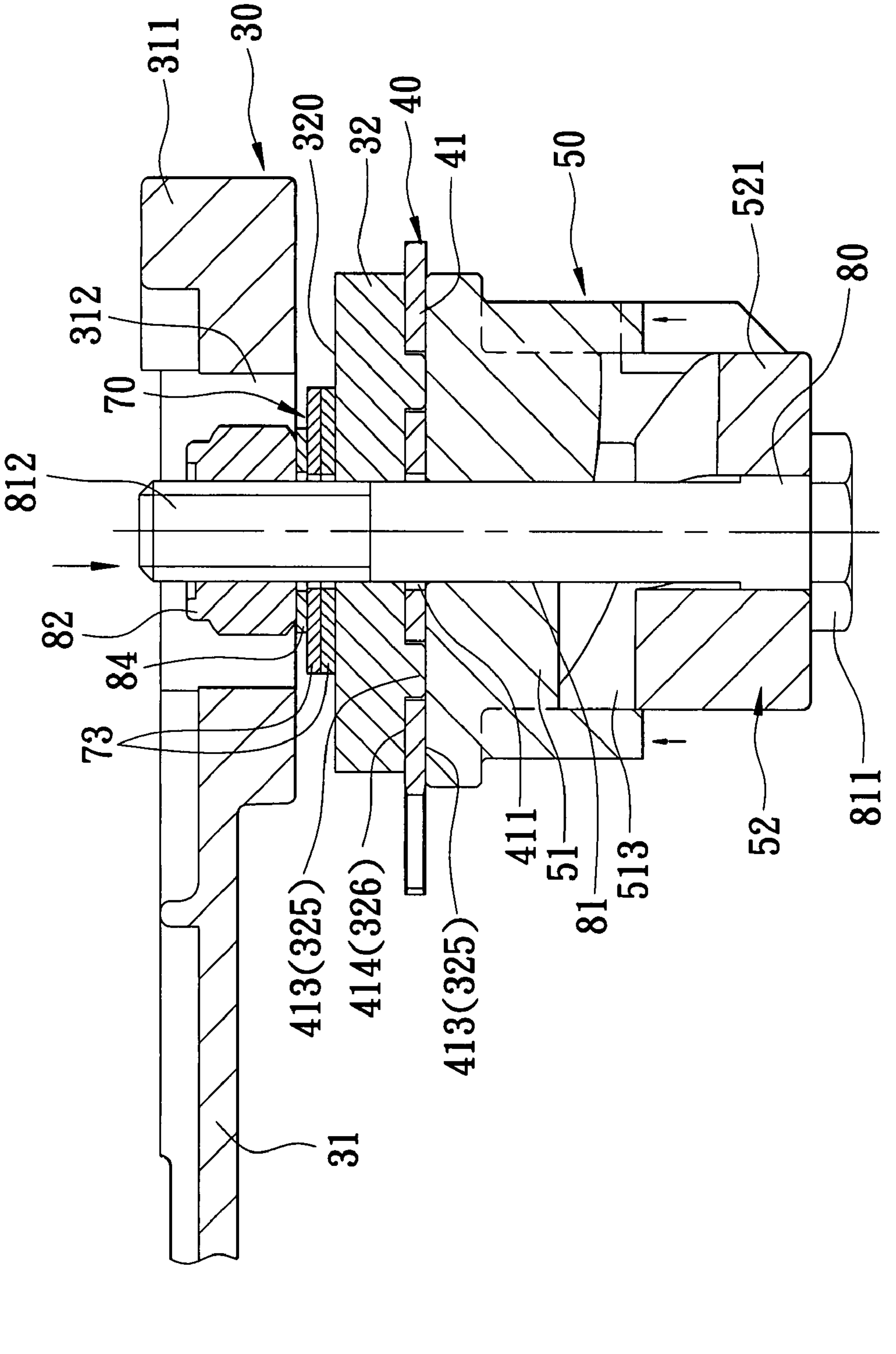
FIG. 11 is a sectional view of the preferred embodiment shown in FIG. 9 when the cam actuating member is in a tightening position.

Alternatively, referring to FIGS. 9 to 11, in another preferred embodiment of the supporting device according to this invention, instead of the coil spring 60, the biasing member 70 includes two spring disks 73 which are sleeved on the shank 81 and which are configured to be squeezable between the major abutment wall 320 and the screw nut 82 so as to acquire the increment of the biasing force. In addition, instead of the flexible joint 83, the tightening bolt 80 has an elastic washer 84 which is interposed between the screw nut 82 and one of the spring disks 73 so as to facilitate restoration of the spring disks 73 to their unsqueezed state once the actuating body 521 is displaced to the loosened position.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A supporting device for mounting a protective cover to shield a cutting blade of a cutting machine which is driven to rotate about a rotating axis, said supporting device comprising:

a mount unit which is adapted to be secured to the cutting machine, said mount unit including a major abutment wall which has a proximate tightening surface that has an axial hole extending therethrough along a tightening axis parallel to the rotating axis of the cutting blade;

a tightening bolt having a shank which is configured to pass through said axial hole, and which has front and rear ends opposite to each other in the tightening axis, and an intermediate segment interposed between said front and rear ends;

a supporting frame which has upper and lower ends opposite to each other, and a middle segment interposed between said upper and lower ends, said upper end being adapted to hold the protective cover, said middle segment having proximate and distal tightened major surfaces opposite to each other along the tightening axis, and a guiding slot which extends through said proximate and distal tightened major surfaces and which permits passage of said shank therethrough, said guiding slot permitting said middle segment to be movable between a position of use where said shank is remote from said upper end, and a retreat position where said shank is closer to said upper end;

a movable tightening member which is sleeved on said shank, and which has a thrust major wall to which the tightening axis is normal, said thrust major wall having a distal tightening surface which confronts and which is to be brought to press said distal tightened major surface so as to force said proximate tightened major surface to abut against said proximate tightening surface, and a cam follower surface which is opposite to said distal tightening surface along the tightening axis, and which has first and second pressed areas that are angularly displaced from each other about the tightening axis, and that are respectively proximate to and distal from said distal tightening surface along the tightening axis;

a cam actuating member including an actuating body which is sleeved on said shank, and which has a cam surface and an outmost major surface opposite to each other in the tightening axis, said cam surface having first and second pressing spots which are angularly displaced from each other about the tightening axis such that, said first and second pressing spots are brought into contact with said first and second pressed areas respectively when said cam surface is brought to mate with said cam follower surface in a loosened position, and such that, when said actuating body is turned about the tightening axis to a tightening position, said first pressing spot is displaced to contact said second pressed area with an axial frictional force so as to move said distal tightening surface to press said distal tightened major surface, thereby forcing said proximate tightened major surface to abut against said proximate tightening surface, and a handgrip disposed to extend from said actuating body radially so as to turn said actuating body about the tightening axis between the loosened and tightening positions; and a biasing member disposed on said shank adjacent to said rear end of said shank such that, as a result of displacement of said actuating body to the tightening position, said biasing member acquires an increment of a biasing force which biases said front end of said shank towards said supporting frame so as to counteract the axial frictional force to thereby keep said actuating body in the tightening position.

2. The supporting device according to claim 1, wherein said mount unit includes a fixed mount adapted to be secured to the cutting machine, and having a throughbore which extends along the tightening axis for passage of said shank, and a movable mount having said major abutment wall, which is disposed forwardly of said fixed mount along the tightening axis to permit said throughbore to be coaxial with said axial hole.

3. The supporting device according to claim 2, wherein said movable mount has an anchoring wall which extends rearwardly from an upper edge of said major abutment wall, and which has a positioning hole that extends therethrough and that is elongated in a longitudinal direction parallel to the tightening axis, said mount unit further including a first screw fastener which extends through said positioning hole and which is secured to said fixed mount such that position of said movable mount relative to said fixed mount in the longitudinal direction is adjustable by movement of said first screw fastener in said positioning hole in the longitudinal direction.

4. The supporting device according to claim 3, wherein said mount unit further includes a second screw fastener which is threadedly engaged with said anchoring wall and which extends to abut against said fixed mount so as to generate a depressing force to render angular position of said major abutment wall of said movable mount relative to said fixed mount adjustable by virtue of varying the depression force.

5. The supporting device according to claim 2, wherein said tightening bolt has a screw nut which is threadedly engaged with said rear end of said shank, said biasing member being a coil spring which is disposed to surround said shank and between said major abutment wall and said screw nut so as to acquire the increment of the biasing force.

6. The supporting device according to claim 5, wherein said tightening bolt has a flexible joint which is received in said throughbore, which is sleeved on said shank between said screw nut and said major abutment wall of said movable mount, and which has an accommodation chamber, said coil spring having an end which abuts against said major abutment wall, and an opposite end which is received in said accommodation chamber so as to permit the biasing force of said coil spring to be adjustable by threaded movement of said screw nut while ensuring the biasing force to be kept in line with the tightening axis.

7. The supporting device according to claim 2, wherein said tightening bolt has a screw nut which is threadedly engaged with said rear end of said shank, said biasing member including two spring disks which are sleeved on said shank and which are configured to be squeezable between said major abutment wall and said screw nut so as to acquire the increment of the biasing force.

8. The supporting device according to claim 7, wherein said tightening bolt has an elastic washer which is interposed between said screw nut and one of said spring disks so as to facilitate restoration of said spring disks to their unsqueezed state once said actuating body is displaced to the loosened position.

9. The supporting device according to claim 1, further comprising a retaining unit which is disposed between said proximate tightening surface and said proximate tightened major surface and which is configured to retain said supporting frame in a corresponding one of the position of use and the retreat position.

* * * * *